(12) United States Patent
Minemura et al.

(10) Patent No.: US 9,357,192 B2
(45) Date of Patent: May 31, 2016

(54) VIDEO SENDER AND VIDEO RECEIVER

(71) Applicants: Kabushiki Kaisha Toshiba, Minato-ku, Tokyo (JP); Toshiba Lifestyle Products & Services Corporation, Ome, Tokyo (JP)

(72) Inventors: Takashi Minemura, Ome Tokyo (JP); Nobuaki Suzuki, Akishima Tokyo (JP); Takashi Doi, Fuchu Tokyo (JP); Hideki Miyasato, Yokohama Kanagawa (JP)

(73) Assignees: Kabushiki Kaisha Toshiba, Tokyo (JP); Toshiba Lifestyle Products & Services Corporation, Tokyo (JP)

( * ) Notice: Subject to any disclaimer, the term of this patent is extended or adjusted under 35 U.S.C. 154(b) by 0 days.

(21) Appl. No.: 14/595,482

(22) Filed: Jan. 13, 2015

(65) Prior Publication Data

US 2015/0124168 A1 May 7, 2015

Related U.S. Application Data

(63) Continuation of application No. 13/774,325, filed on Feb. 22, 2013, now Pat. No. 8,984,181.

(30) Foreign Application Priority Data

Jun. 11, 2012 (JP) ................................ 2012-131472

(51) Int. Cl.
*H04N 7/00* (2011.01)
*H04N 17/00* (2006.01)
(Continued)

(52) U.S. Cl.
CPC ................. *H04N 9/64* (2013.01); *G09G 5/006* (2013.01); *H04N 1/00095* (2013.01);
(Continued)

(58) Field of Classification Search
CPC ......... G06F 3/005; G06F 13/28; G06F 21/00; H04N 5/04; H04N 1/00095; H04N 1/00114

USPC ............ 348/503, 38, 192, 517; 710/68, 8, 33, 710/58, 100
See application file for complete search history.

(56) References Cited

U.S. PATENT DOCUMENTS 5,835,152 A 11/1998 Hori
5,847,767 A 12/1998 Ueda
(Continued)

FOREIGN PATENT DOCUMENTS

JP H09-200801 A 7/1997
JP 2002-125207 A 4/2002
(Continued)

OTHER PUBLICATIONS

U.S. Appl. No. 13/774,325, filed Feb. 22, 2013, Minemura et al.
(Continued)

*Primary Examiner* — Idriss N Alrobaye
*Assistant Examiner* — Getente A Yimer
(74) *Attorney, Agent, or Firm* — Knobbe, Martens, Olson & Bear LLP

(57) ABSTRACT

According to one embodiment, a video sender comprises: a video processor and a communication module. The video processor creates video. The communication module is configured to communicate with a video receiver. The communication module comprises: a receiver and a transmitter. The receiver receives, from the video receiver, specific information specifying which one of a color signal and a frame rate takes precedence over the other one in transmission. The transmitter converts the video created by the video processor into video in which one of the color signal and the frame rate takes precedence over the other one in accordance with the specific information, and transmit the video thus converted to the video receiver.

12 Claims, 8 Drawing Sheets

(51) Int. Cl.

| | | |
|---|---|---|
| *H04N 17/02* | (2006.01) | |
| *H04N 9/47* | (2006.01) | |
| *H04N 9/475* | (2006.01) | |
| *G06F 3/00* | (2006.01) | |
| *G06F 13/00* | (2006.01) | |
| *H04N 9/64* | (2006.01) | |
| *H04N 1/00* | (2006.01) | |
| *G09G 5/00* | (2006.01) | |
| *H04N 21/4363* | (2011.01) | |
| *H04N 21/4402* | (2011.01) | |
| *H04N 21/462* | (2011.01) | |
| *H04N 21/432* | (2011.01) | |
| *H04N 21/485* | (2011.01) | |
| *H04N 5/04* | (2006.01) | |
| *G09G 5/36* | (2006.01) | |

(52) U.S. Cl.
CPC ............ *H04N 1/00114* (2013.01); *H04N 5/04* (2013.01); *H04N 21/4325* (2013.01); *H04N 21/43635* (2013.01); *H04N 21/440263* (2013.01); *H04N 21/440281* (2013.01); *H04N 21/4621* (2013.01); *H04N 21/485* (2013.01); *G09G 5/003* (2013.01); *G09G 5/36* (2013.01); *G09G 2320/0613* (2013.01); *G09G 2320/08* (2013.01); *G09G 2340/0407* (2013.01); *G09G 2340/0428* (2013.01); *G09G 2340/0435* (2013.01); *G09G 2350/00* (2013.01); *G09G 2370/045* (2013.01); *G09G 2370/06* (2013.01); *G09G 2370/12* (2013.01)

(56) References Cited

U.S. PATENT DOCUMENTS

| | | | |
|---|---|---|---|
| 7,088,398 B1 | 8/2006 | Wolf et al. | |
| 7,257,163 B2 | 8/2007 | Hwang et al. | |
| 7,359,437 B2 | 4/2008 | Hwang et al. | |
| 7,379,121 B2 | 5/2008 | Suzuki et al. | |
| 7,636,132 B2 | 12/2009 | Sakamoto | |
| 8,200,062 B2 | 6/2012 | Itani | |
| 8,290,339 B2 | 10/2012 | Noritake | |
| 8,422,553 B2 | 4/2013 | Fukuhara et al. | |
| 8,625,666 B2* | 1/2014 | Bakke ................. | H04N 19/186 345/589 |
| 2002/0071052 A1 | 6/2002 | Itoh et al. | |
| 2002/0171761 A1 | 11/2002 | Suzuki et al. | |
| 2003/0151610 A1* | 8/2003 | Kuriakin ................. | G09G 5/42 345/589 |
| 2003/0206242 A1* | 11/2003 | Choi ....................... | G09G 5/006 348/441 |
| 2004/0208380 A1 | 10/2004 | Aoki et al. | |
| 2005/0200630 A1 | 9/2005 | Evans et al. | |
| 2006/0090141 A1 | 4/2006 | Loui et al. | |
| 2007/0040810 A1 | 2/2007 | Dowe et al. | |
| 2007/0081796 A1 | 4/2007 | Fredlund et al. | |
| 2007/0091120 A1 | 4/2007 | Oura | |
| 2007/0153918 A1 | 7/2007 | Rodriguez | |
| 2007/0160153 A1 | 7/2007 | Sullivan | |
| 2007/0188515 A1* | 8/2007 | Li ........................... | H04N 9/64 345/604 |
| 2007/0262979 A1* | 11/2007 | Klebanov ............... | G09G 5/003 345/418 |
| 2007/0296859 A1 | 12/2007 | Suzuki | |
| 2008/0101467 A1 | 5/2008 | MacMullan | |
| 2008/0101476 A1 | 5/2008 | Tian | |
| 2008/0270635 A1 | 10/2008 | Nakahama | |
| 2009/0103947 A1 | 4/2009 | Inoue et al. | |
| 2009/0116970 A1 | 5/2009 | Inoue et al. | |
| 2009/0141180 A1 | 6/2009 | Kondo et al. | |
| 2009/0174818 A1 | 7/2009 | Morita et al. | |
| 2009/0231487 A1* | 9/2009 | Nakagawa ............. | H04N 9/642 348/453 |
| 2009/0278984 A1 | 11/2009 | Suzuki et al. | |
| 2010/0033627 A1 | 2/2010 | Hayashi et al. | |
| 2010/0066906 A1 | 3/2010 | Nakajima | |
| 2010/0073574 A1 | 3/2010 | Nakajima et al. | |
| 2010/0182402 A1 | 7/2010 | Nakajima et al. | |
| 2010/0214480 A1 | 8/2010 | Kitamori | |
| 2011/0038596 A1 | 2/2011 | Noritake | |
| 2011/0043701 A1 | 2/2011 | Kurita et al. | |
| 2011/0134318 A1 | 6/2011 | Chang et al. | |
| 2011/0134319 A1 | 6/2011 | Chang et al. | |
| 2011/0135199 A1 | 6/2011 | Choi et al. | |
| 2011/0273622 A1* | 11/2011 | Ngo .................... | H04N 21/6131 348/663 |
| 2012/0069145 A1 | 3/2012 | Sugimura | |
| 2012/0293710 A1 | 11/2012 | Yamashita | |
| 2013/0055407 A1 | 2/2013 | Hirayama et al. | |
| 2013/0100244 A1 | 4/2013 | Suzuki et al. | |
| 2013/0141534 A1 | 6/2013 | Hattori | |
| 2013/0208183 A1 | 8/2013 | Suzuki et al. | |
| 2013/0251047 A1 | 9/2013 | Rodriguez | |
| 2013/0329138 A1 | 12/2013 | Minemura et al. | |
| 2014/0092211 A1 | 4/2014 | Nakajima et al. | |

FOREIGN PATENT DOCUMENTS

| | | |
|---|---|---|
| JP | 2002-290974 A | 10/2002 |
| JP | 2004-254133 A | 9/2004 |
| JP | 2004-343726 A | 12/2004 |
| JP | 2004-357012 | 12/2004 |
| JP | 2005-514873 A | 5/2005 |
| JP | 2007-311929 A | 11/2007 |
| JP | 2007-312376 A | 11/2007 |
| JP | 2008-252819 A | 10/2008 |
| JP | 2008-271460 | 11/2008 |
| JP | 2009-135726 | 6/2009 |
| JP | 2009-147738 | 7/2009 |
| JP | 2009-213110 A | 9/2009 |
| JP | 2009-213116 A | 9/2009 |
| JP | 2010/011154 A | 1/2010 |
| JP | 2010-028261 A | 2/2010 |
| JP | 2010-193247 | 9/2010 |
| JP | 2010-237726 A | 10/2010 |
| JP | 2011/044868 A | 3/2011 |
| JP | 2011/166198 A | 8/2011 |
| JP | 2013-031024 A | 2/2013 |
| JP | 2013-051606 | 3/2013 |
| JP | 2015-029337 A | 2/2015 |
| WO | WO 03/058946 A1 | 7/2003 |
| WO | WO 2008/053851 A1 | 5/2008 |
| WO | WO 2012/029885 | 3/2012 |

OTHER PUBLICATIONS

The Extended European Search Report dated Sep. 10, 2013 issued by European Patent Office in European Patent Application No. 13153335.8—10 pages.

Thomas Kugelstadt, "Support HDMI 1.3 12-Bit Deep Color With the TMDS341A," Texas Instruments Incorporated, May 10, 2007, URL: http://www.ti.com/lit/an/slla263/slla263.pdf.

Notice of Rejection mailed by Japan Patent Office on May 21, 2013 in Japanese Patent Application 2012-131472—4 pages.

Notice of Rejection mailed by Japan Patent Office on Jul. 1, 2014 in Japanese patent application No. 2013-210165, which is a divisional application of JP. 2012-131472—5 pages.

Decision to Grant a Patent mailed by Japan Patent Office on Jan. 6, 2015 in the Japanese patent application No. 2013-210165, which is a divisional application for JP 2012-131472—5 pages.

Japanese Office Action for corresponding Japanese Application No. 2012-111976, mailed Nov. 13, 2012, 11 pages.

Extended European Search Report for Corresponding European Application No. 12173573.2-1228, dated Jan. 24, 2013, 7 pages.

Japanese Office Action Decision of Refusal for Corresponding Japanese Application No. 2013-055503 which is a divisional application of JP 2012-111976 to which this application claims priority, mailed Jul. 1, 2014, 7 pages.

Japanese Office Action dated May 19, 2015 for JP Application No. 2015-010699.

\* cited by examiner

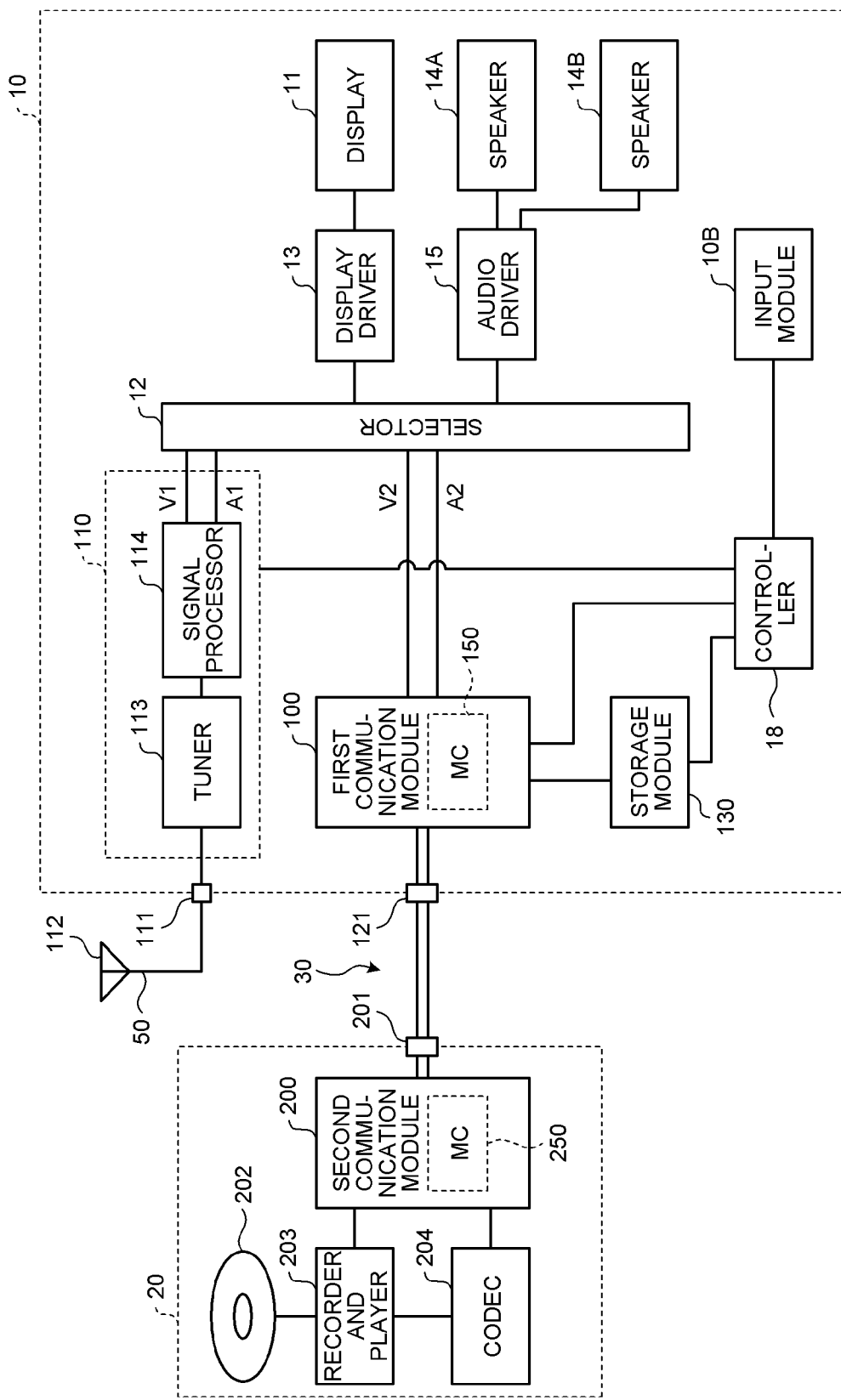

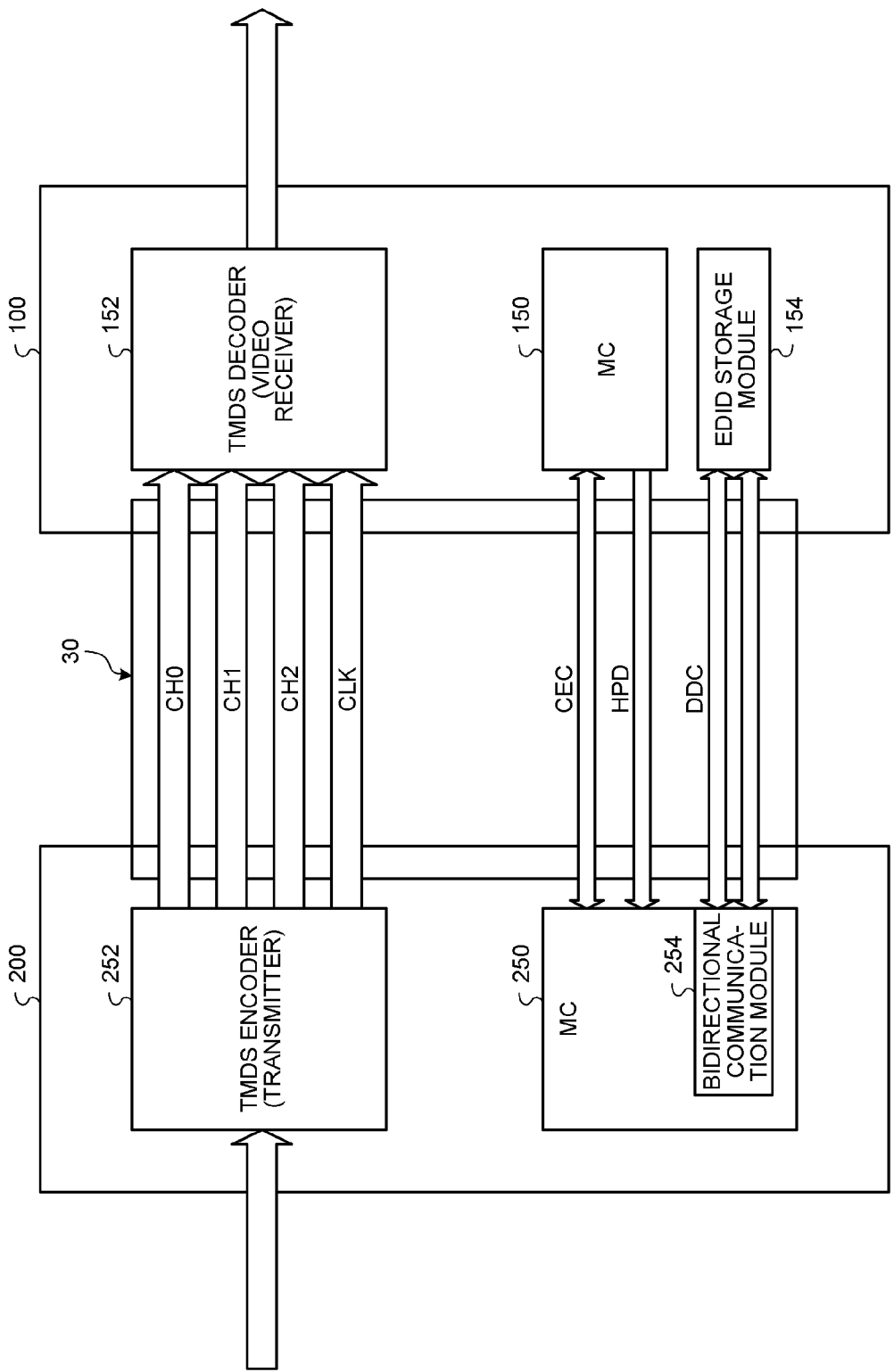

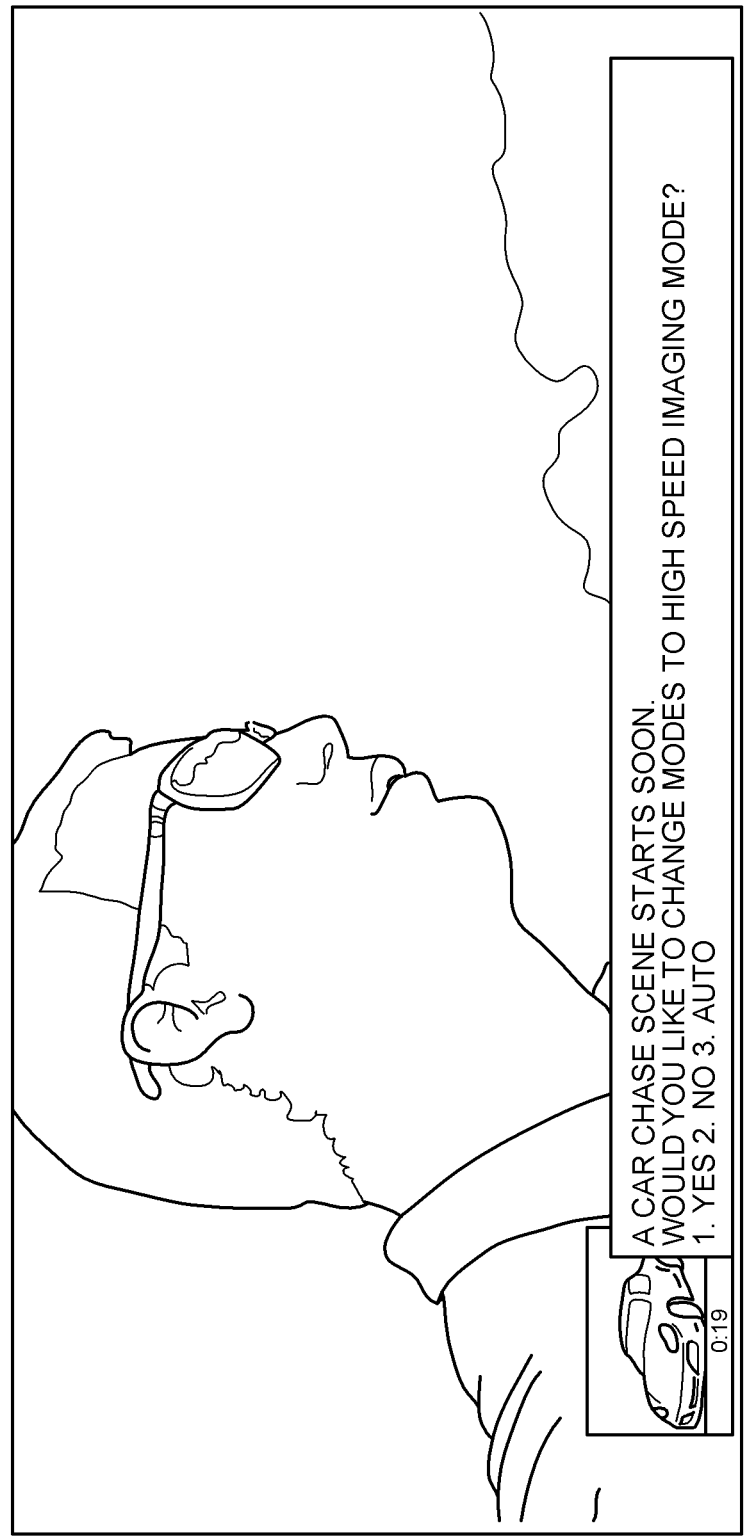

VIDEO SENDER AND VIDEO RECEIVER

CROSS-REFERENCE TO RELATED APPLICATIONS

This application is a continuation of U.S. patent application Ser. No. 13/774,325, filed Feb. 22, 2013 which is based upon and claims the benefit of priority from Japanese Patent Application No. 2012-131472, filed Jun. 11, 2012, the entire contents of each of which are incorporated herein by reference.

FIELD

Embodiments described herein relate generally to a video sender and a video receiver.

BACKGROUND

High-Definition Multimedia Interface (HDMI) is an example of multimedia interfaces between a video sender such as a Blu-ray (registered trademark) disc (BD) player, a digital versatile disc (DVD) player, and a set-top box, and a video receiver such as a television set and a monitor. A device with an HDMI output port is referred to as a source device, while a device with an HDMI input port is referred to as a sink device. The video sender is a source device, while the video receiver is a sink device.

In HDMI communication equipment that performs communication compliant to the HDMI standards comprises a transition minimized differential signaling (TMDS) transmitter, a +5V power supply signal transmitter, a hot plug detect (HPD) signal transmitter, an extended display identification data (EDID) transmitter, a high-bandwidth digital content protection (HDCP) recognizer, and a consumer electronics control (CEC) transmitter. The TMDS transmitter transmits video, audio, and auxiliary information. The +5V power supply signal transmitter notifies the sink device of a coupling using a source ready signal when the source device is coupled to the sink device. The HPD signal transmitter transmits an HPD signal as a sink ready signal representing that the sink device is ready to receive video information. The EDID transmitter transmits EDID such as data of product information of the sink device coupled and a compatible video format. The HDCP recognizer recognizes the sink device. The CEC transmitter transmits an apparatus control signal and a CEC that is a control protocol. The EDID transmitter comprises a function as a sender that transmits the EDID through a display data channel (DDC).

In related art, before video contents are sent from the video sender to the video receiver, the video sender has made settings of image quality and a frame rate of the video contents transmitted. It is also publicly known that the function of the video receiver is sent to the video sender using EDID.

However, in the conventional technology, when the video sender cannot transmit all color signals for all frames of the video that can be output to the video receiver because, for example, the transmission path has a limited bandwidth, the video receiver cannot make a setting on which of the color signal or the frame rate takes precedence.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary block diagram of a structure of the video receiver and the video sender in the embodiment;

FIG. 3 is an exemplary block diagram of a structure of a first communication module of the video receiver and a second communication module of the video sender in the embodiment;

FIG. 8 is still another exemplary diagram of the screen of the display in the embodiment.

DETAILED DESCRIPTION

In general, according to one embodiment, a video sender comprises: a video processor configured to create video; and a communication module configured to communicate with a video receiver. The communication module comprises: a receiver; and a transmitter. The receiver is configured to receive, from the video receiver, specific information specifying which one of a color signal and a frame rate takes precedence over the other one in transmission. The transmitter is configured to convert the video created by the video processor into video in which one of the color signal and the frame rate takes precedence over the other one in accordance with the specific information, and transmit the video thus converted to the video receiver.

Figure 1:
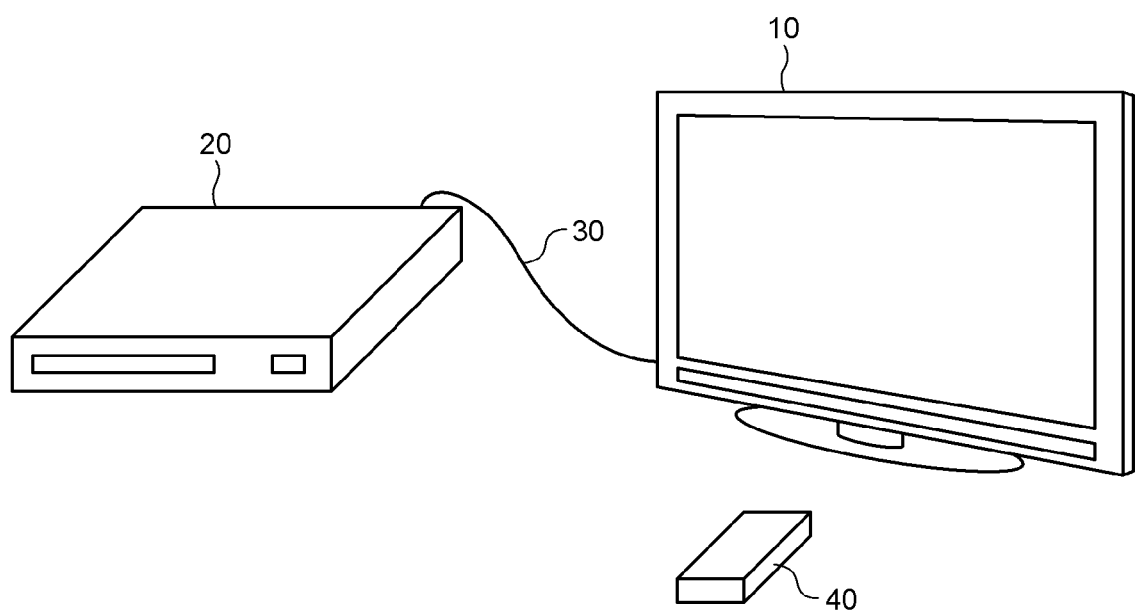
FIG. 1 is an exemplary external view illustrating a coupling between a video receiver and a video sender according to an embodiment.

With reference to the accompanying drawings, embodiments of the video receiver and the video sender will now be described in detail. FIG. 1 is an external view illustrating an example of a coupling between a video receiver 10 and a video sender 20 in the embodiment. As illustrated in FIG. 1, the video receiver 10 is coupled to the video sender 20, for example, through an HDMI cable 30.

The video receiver 10 is a digital television set, for example, having a resolution of 4K (4K by 2K) pixels. More specifically, the resolution of the video receiver 10 is 4096×2160 pixels, or quad full high definition (QFHD) (3840×2160 pixels), which is four times as many pixels as full high definition (FHD) (1920×1080 pixels). The video receiver 10 complies with the HDMI standards, and is referred to as a sink device having an HDMI input port. The video receiver 10 operates in accordance with signals that are input through a remote control 40.

The video sender 20 creates video having a resolution of 4K, and sends out the video thus created to the video receiver 10. The video sender 20 complies with the HDMI standards, and is referred to as a source device having an HDMI output port. The video sender 20 plays video recorded in a medium such as a Blu-ray (registered trademark) disc (BD) to be sent to the video receiver 10 through the HDMI cable 30.

The video sender 20 has a function that receives specific information specifying which one of the color signal and the frame rate takes precedence over other one of the color signal and the frame rate in data transmission from the video receiver 10, and converts the video created by reproduction, for example, into video in which one of the color signal and the frame rate takes precedence over other one of the color signal and the frame rate in accordance with the specific information described above to be transmitted to the video receiver 10. The specific information is information that uniquely specifies a combination of a video format (Y, Cb, Cr) and a frame rate transmitted from the video sender 20 to the video receiver 10. The specific information is, for example, a unique code value associated with each of combinations of the video format and the frame rate. For example, specific information in which a code value "1" is associated with a combination of the video format of 4:2:0 and the frame rate of 60 fps, while a code value "0" is associated with a combination of the video format of 4:4:4 and the frame rate of 30 fps can be used. The specific information may be information representing a user's preference such as "image quality is preferred" and "movement is preferred". The video sender 20 converts the specific information received into the corresponding setting information using a conversion table or the like. The setting information comprises a combination of a value representing the video format (Y, Cb, Cr) and a value representing the frame rate for the video transmitted by the video sender 20 to the video receiver 10. The video sender 20 may receive the setting information itself from the video receiver 10 to set the video format and the frame rate in accordance with the setting information received. When the information representing which one of the color signal and the frame rate the user prefers in video transmission is sent to the video sender 20 through the video receiver 10, the video sender 20 sends the video in which one of the color signal and the frame rate takes precedence over other one of the color signal and the frame rate in accordance with the user's preference to the video receiver 10. The video receiver 10 can receive and display the video sent by the video sender 20. The video sender 20 outputs video in two or more operation modes comprising a combination of the color signal (Y, Cb, Cr) and the frame rate, such as a "4:2:2, 30 Hz" mode, a "4:2:0, 60 Hz" mode, and a "4:4:4, 30 Hz mode" to the HDMI cable 30.

FIG. 2 is a block diagram of an example of the structure of the video receiver 10 and the video sender 20. As illustrated in FIG. 2, the video receiver 10 comprises a television function module 110, a first communication module 100, a storage module 130, a selector 12, a display 11, a display driver 13, speakers 14A, 14B, an audio driver 15, a controller 18, and an input module 10B. The television function module 110 receives a television broadcast signal. The first communication module 100 is a communication apparatus that receives the digital video signal compliant to the HDMI standards. The storage module 130 stores therein a setting history that is a history of the setting information that has been sent, or a selection history that is a history of selecting the specific information. The selector 12 selects the output from the television function module 110 or the output from the first communication module 100. The display driver 13 displays video on the display 11 in accordance with a video signal that is output from the selector 12. The audio driver 15 outputs audio to the speakers 14A, 14B in accordance with an audio signal that is output from the selector 12. The controller 18 controls the components of the video receiver 10. The input module 10B accepts inputs such as a setting for the video receiver 10.

The setting history stored in the storage module 130 is data in which each category of video is associated with the user's preference of which one of the color signal and the frame rate taking precedence over other one of the color signal and the frame rate, for example. Specifically, an example of the setting history is data representing a history in which a user made settings so that the video in which the frame rate takes precedence over the color signal (e.g., video in a "4:2:0, 60 Hz" mode) in transmission is sent for video of the category of sports or other active movements. Another example of the setting history is data representing a history in which the user made settings so that the video in which the color signal takes precedence over the frame rate (e.g., video in a "4:4:4, 30 Hz" mode) in transmission is sent for the category of BD movies at a frame rate of 24 fps. The storage module 130 may store therein specific information specifying which one of the color signal and the frame rate the user preferred for each category of video rather than store therein the setting history. The specific information may be information on which one of the color signal and the frame rate takes precedence over other one of the color signal and the frame rate is specified in transmission by selection from among some options.

The television function module 110 comprises a tuner 113 receiving the television broadcast signal using an antenna 112 coupled to a television (TV) input port 111 through an aerial cable 50 to extract the signal of a predetermined channel, and a signal processor 114 accepting a received signal that is output by the tuner 113 to be restored to a video signal V1 and an audio signal A1.

The first communication module 100 separates digital video signals of the HDMI standards received from a second communication module 200 of the video sender 20 coupled to a connector 121 through the HDMI cable 30 to a video component and an audio component to be output as a video signal V2 and an audio signal A2. The first communication module 100 comprises a micro computer (MC) 150 capable of communicating to and from the second communication module 200.

The selector 12 comprises a function selectively switches between a combination of the video signal V1 and the audio signal A1 output from the television function module 110 and a combination of the video signal V2 and the audio signal A2 output from the first communication module 100, and outputs the selected one of the combinations to display driver 13 and the audio driver 15.

The video sender 20 comprises the second communication module 200, a recorder and player 203, and a codec 204. The second communication module 200 is a communication apparatus coupled to the first communication module 100 of the video receiver 10 through the HDMI cable 30 to which a connector 201 is coupled. The recorder and player 203 performs recording and reproduction with respect to a recording medium 202 such as a Blu-ray (registered trademark) disc. The codec 204 performs mpeg-decoding encode data supplied from the recorder and player 203 to the video signal and the audio signal in a baseband, which in turn supplied to the second communication module 200. That is to say, the recording medium 202, the recorder and player 203, and the codec 204 constitute a video creator that creates video. The recorder and player 203 can also record the encode data that is output from the codec 204, the second the encode data that is output from the second communication module 200.

The second communication module 200 comprises a micro computer (MC) 250 capable of communicating with respect to the first communication module 100.

FIG. 3 is a block diagram of an example of the structure of the first communication module 100 of the video receiver 10 and the second communication module 200 of the video sender 20. The second communication module 200 comprises the micro computer (MC) 250 and a TMDS encoder (transmitter) 252. The MC 250 comprises a bidirectional communication module 254. The bidirectional communication module 254 comprises a function as a receiver receiving the specific information from the video receiver 10, and a function as a sender sending the content information to the video receiver 10 before the receiver receives the specific information, for example. The bidirectional communication module 254 may be comprised in the MC 250 or provided independently. The first communication module 100 comprises the micro computer (MC) 150, a TMDS decoder (video receiver) 152 and an EDID storage module 154. The MC 150 comprises a function as a sender sending the specific information to the video sender 20.

To the TMDS encoder 252, video created by the recording medium 202, the recorder and player 203, and the codec 204, for example, video data including RGB (red, blue, green) of 8 bits each is input. The TMDS encoder 252 converts the input video data into the video data (video) in which one of the color signal and the frame rate takes precedence over other one of the color signal and the frame rate in accordance with the specific information, and outputs a pixel clock created by this conversion. For example, when the specific information is a code value "1", the TMDS encoder 252 converts the input video data into the video data with the video format of 4:2:0 and the frame rate of 60 fps. The difference amplifier (not illustrated) converts the pixel clock that has been output from the TMDS encoder 252 into the differential signal to be output to transmission lines ranged from CH0 to CH2 of the HDMI cable 30. The difference amplifiers are provided so as to correspond to each of the transmission lines ranged from CH0 to CH2. The differential signals are transmitted to the first communication module 100 through the transmission lines ranged from CH0 to CH2. The TMDS encoder 252 may perform converting the video data in accordance with the content information. For example, the TMDS encoder 252 may be determined in advance to perform converting movie contents having the frame rate of 24 fps so that the color signal takes precedence.

In the first communication module 100, the difference amplifiers (not illustrated) are provided for each of CH0 to CH2 respectively. After receiving the differential signals from CH0 to CH2, the difference amplifier converts the differential signals into data to be output to the TMDS decoder 152. The TMDS decoder 152 decodes the data into the video data of RGB of 8 bits each to be output to the selector 12.

The MC 250 of the video sender 20 is coupled to the MC 150 of the video receiver 10 through a CEC line and a HPD line. The MC 250 and the MC 150 transmit information to control devices to each other through the CEC line. The CEC line bidirectionally transmits a CEC command or a CEC command group or the like including the specific information. The MC 250 notifies the video sender 20 of completion of ready for transmitting a signal in response to completion of turning on the video receiver 10 through the HPD line. The bidirectional communication module 254 of the MC 250 is coupled to the EDID storage module 154 of the video receiver 10 through a DDC line. The bidirectional communication module 254 reads out EDID from the EDID storage module 154. The EDID comprises a format or the like that can be used by the video receiver 10 and is data representing capability of the video receiver 10.

Figure 4A:
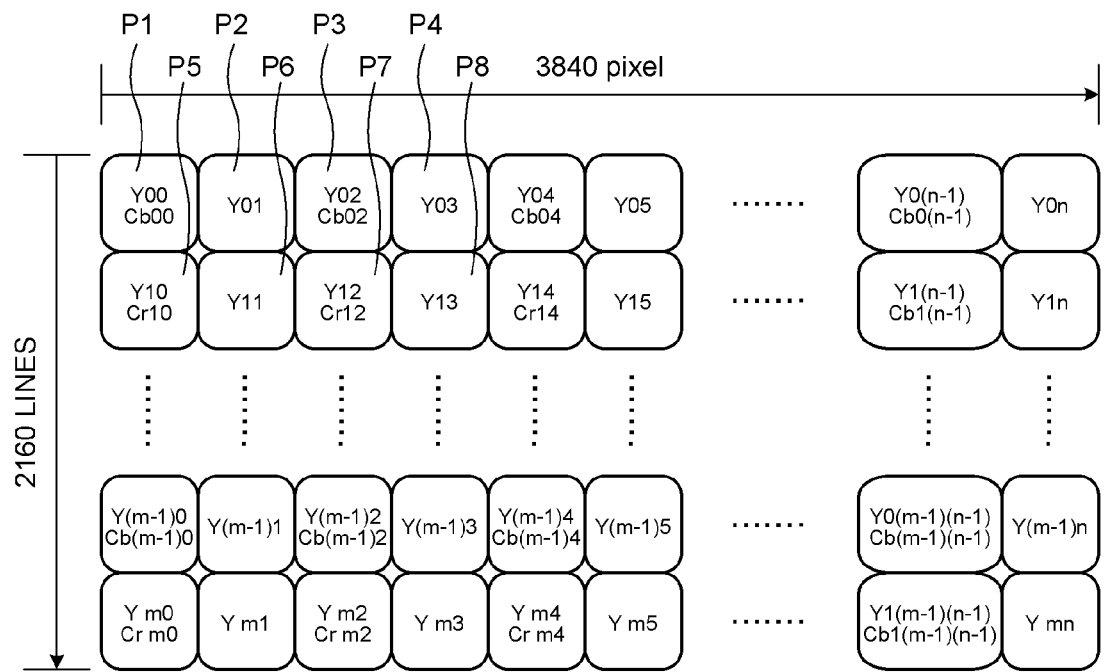
FIG. 4A is an exemplary diagram of a format of video data with a video format of 4:2:0 and a frame rate of 60 fps in the embodiment.
Figure 4B:
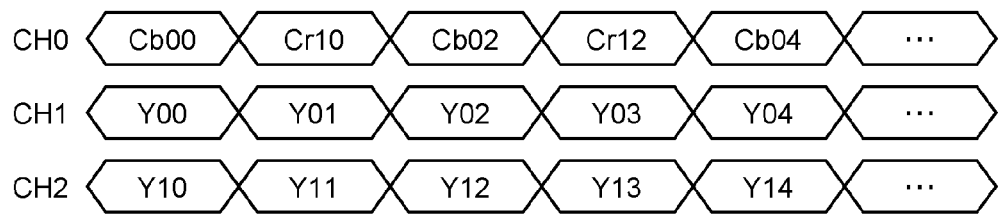
FIG. 4B is an exemplary diagram of a format of a differential signal that is output from a difference amplifier to CH0 to CH2 in the embodiment.

FIG. 4A is a diagram illustrating an example of a format of video data with the video format of 4:2:0 and the frame rate of 60 fps. FIG. 4B is a diagram of an example of a format of differential signals that are output from difference amplifiers to CH0 to CH2.

FIG. 4A illustrates an example of a format with the video format of 4:2:0 in 3840×2160 pixels. Luminance information Y00 represents luminance information on a pixel P1. First color difference information Cb00 represents a color difference Cb on four pixels: the pixel P1, a pixel P2 adjacent to the pixel P1, pixels P5 and P6 adjacent downward to the pixels P1 and P2. The first color difference information Cb00 may represent the color difference Cb on the pixel P1 only. Second color difference information Cr10 represents a color difference Cr on four pixels: the pixel P5, the pixel P6 adjacent to the pixel P5, pixels P1 and P2 adjacent upward to the pixels P5 and P6. Second color difference information Cr10 may represent the color difference Cr on the pixel P5 only. Luminance information Y01 represents the luminance of the pixel P2, while luminance information Y10 represents the luminance of the pixel P5, and luminance information Y11 represents the luminance of the pixel P6.

In the same manner, luminance information Y02 represents the luminance of a pixel P3. First color difference information Cb02 represents the color difference Cb on four pixels: the pixel P3, a pixel P4 adjacent to the pixel P3, pixels P7 and P8 adjacent downward to the pixels P3 and P4. The first color difference information Cb02 may represent the color difference Cb on the pixel P3 only. Second color difference information Cr12 represents the color difference Cr on four pixels: the pixel P7, the pixel P8 adjacent to the pixel P7, the pixels P3 and P4 adjacent upward to the pixels P7 and P8. The second color difference information Cr12 may represent the color difference Cr on the pixel P7 only. Luminance information Y03 represents the luminance of the pixel P4, while luminance information Y12 represents the luminance of the pixel P7, and the luminance information Y13 represents the luminance of the pixel P8.

FIG. 4B is a diagram illustrating an example of signals that are output from the difference amplifiers (not illustrated) to the transmission lines ranged from CH0 to CH2 of the HDMI cable 30. The second communication module 200 outputs a luminance component Y out of data with the format illustrated in FIG. 4A using two lines out of the transmission lines ranged from CH0 to CH2, and outputs color difference components Cb, Cr together to the remaining one channel out of CH0 to CH2. That is to say, in an example illustrated in FIG. 4B, the second communication module 200 outputs the first color difference information Cb00, the luminance information Y00, and the luminance information Y10 at the same clock timing, and outputs the second color difference information Cr10, the luminance information Y01, and the luminance information Y11 at the same clock timing. Subsequently in the same manner, the second communication module 200 outputs the first color difference information and the luminance information on two pixels, or the second color difference information and the luminance information on two pixels at the same clock timing.

Figure 5:
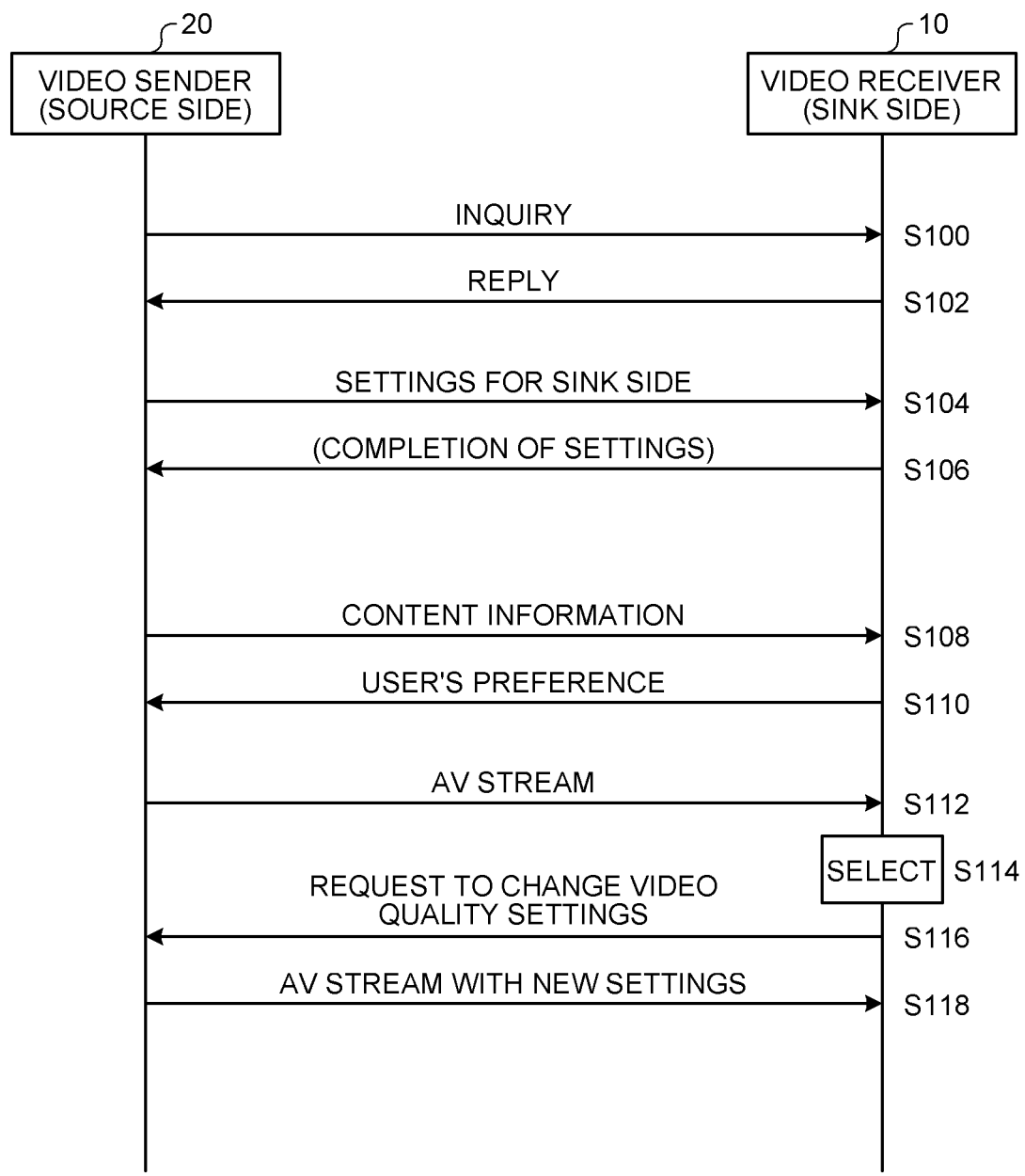
FIG. 5 is an exemplary sequence diagram of operations of the video sender sending video data to the video receiver, in the embodiment.

Operations of the video sender 20 sending video to the video receiver 10 will now be described. FIG. 5 is a sequence diagram illustrating an example of operations of the video sender 20 sending video (AV stream) to the video receiver 10. Once the video sender 20 recognizes that the video receiver 10 is coupled to the video sender 20, the video sender 20 asks the video receiver 10 for the capability (S100).

Then, the video receiver 10 replies back to the video sender 20 by sending capability information (e.g., EDID) (S102).

Subsequently, the video sender 20 instructs the video receiver 10 (a sink side) for initial settings to start video transmission in accordance with the capability of the video receiver 10 (S104).

The video receiver 10 then sends data representing completion of settings instructed to the video sender 20 (S106). This processing at S106 may be omitted.

Next, the video sender 20 sends content information representing an attribute of video to be sent to the video receiver 10, to the video receiver 10 (S108). The content information comprises, for example, a category of video output by the video sender 20, a resolution, and a type of a medium from which the recorder and player 203 reproduces video. The content information may comprise information for a user to readily determine which one of the color signal and the frame rate takes precedence over other one of the color signal and the frame rate for the video transmitted from the video sender 20 to the video receiver 10 in accordance with the user's preference.

The video receiver 10 then sends the specific information corresponding to the content information sent in the processing at S108 to the video sender 20 (S110). For example, for video contents involving active movements, the specific information in which the frame rate takes precedence over the color signal is adopted, while for video contents involving few movements, the specific information in which the color signal takes precedence over the frame rate is adopted. The video receiver 10 may select the specific information corresponding to the content information from the selection history stored in the storage module 130, for example. Then, the video receiver 10 may send the specific information selected as information reflecting the user's preference to the video sender 20.

Subsequently, the video sender 20 sends the video converted by the second communication module 200 so that one of the color signal and the frame rate takes precedence over other one of the color signal and the frame rate in accordance with the specific information sent in the processing at S110 (S112).

The video receiver 10 then newly selects which one of the color signal and the frame rate should take precedence over other one of the color signal and the frame rate for the video sent from the video sender 20 in accordance with the input from the user accepted through the remote control 40, for example (S114).

Figure 6:
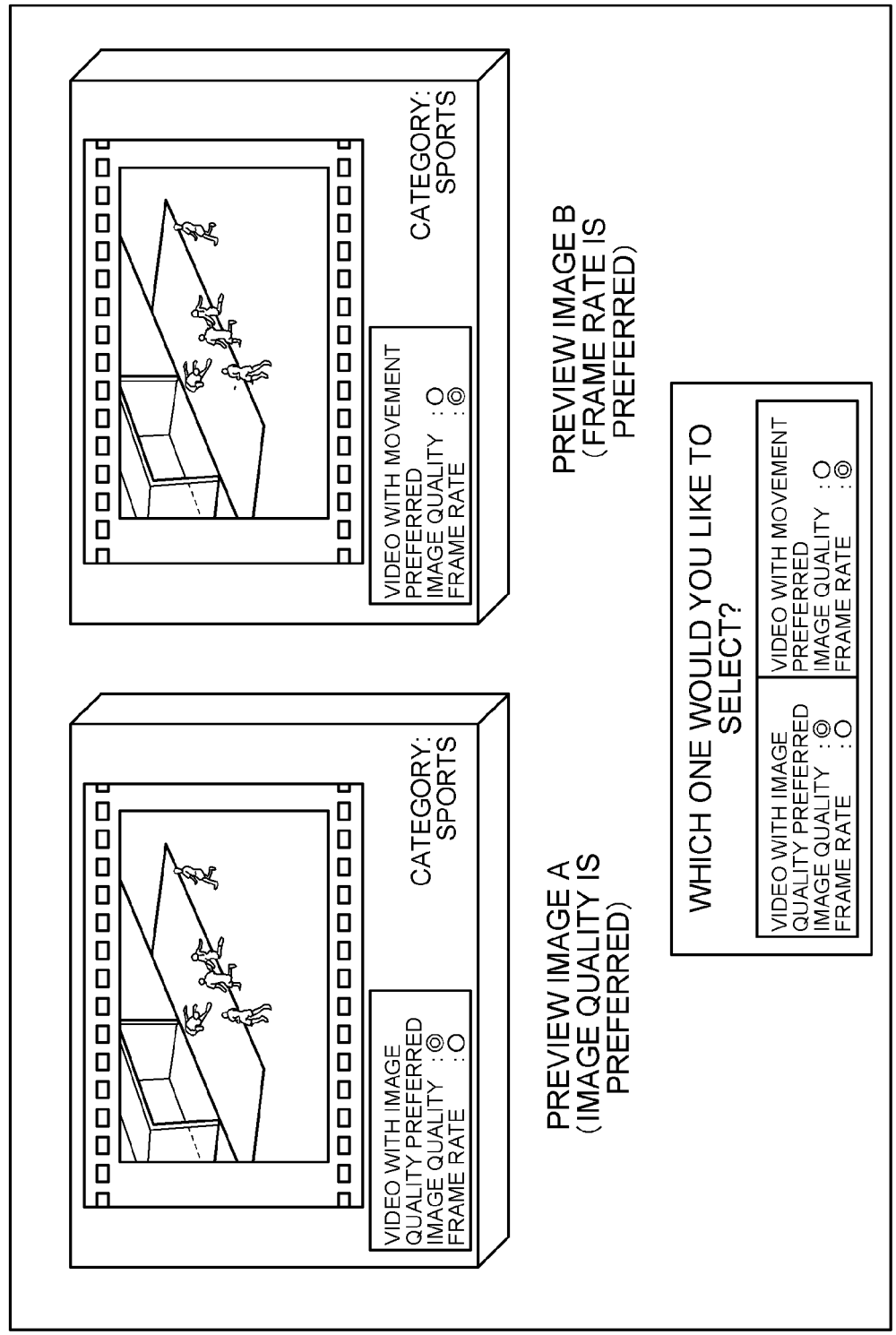
FIG. 6 is an exemplary diagram of a screen of a display in the embodiment.

FIG. 6 is an example of a screen (user interface) displayed on the display 11 of when the video receiver 10 selects one of video in which the color signal takes precedence over the frame rate and video in which the frame rate takes precedence over the color signal, to be sent to the video receiver 10. The screen illustrated in FIG. 6 is displayed on the display 11 in response to an input from a user accepted through the remote control 40, for example. In the processing at S114, the display 11 displays a preview image A representing that image quality is preferred (the color signal takes precedence over the frame rate) and a preview image B representing that the frame rate takes precedence over the color signal, side by side. When the user selects either "image quality is preferred" or "movement is preferred" through the remote control 40 after comparing the categories of video and the preview images A and B displayed on the display 11, the video receiver 10 selects one of the color signal and the frame rate which should take precedence over other one of the color signal and the frame rate, for the video sent from the video sender 20, in accordance with the user's selection. The result selected by the video receiver 10 becomes the specific information.

With reference to FIG. 5 again, the video receiver 10 sends the result selected in the processing at S114 as a request to change video quality settings to the video sender 20 (S116).

Then, the video sender 20 sends the video in which one of the color signal and the frame rate takes preference over other one of the color signal and the frame rate in accordance with the request to change video quality settings sent in the processing at S116, as AV stream with new settings to the video receiver 10 (S118).

For an example of operations illustrated in FIG. 5, the example in which the video receiver 10 sends the specific information corresponding to the content information sent in the processing at S108 selected from the specific information stored in the storage module 130 has been described. However, the embodiment is not limited to the example.

For example, the video receiver 10 may be structured so that when the content information is sent in the processing at S108 the screen illustrated in FIG. 6 is displayed on the display 11 and the processing at S110 is performed in accordance with the input from the user. The video receiver 10 may send the setting information instead of the specific information in the processing at S110. The video receiver 10 may also send the specific information described above to the video sender 20 in the processing at S110 so that the video sender 20 specifically sets the color signal or the frame rate for video in accordance with the specific information.

Figure 7:
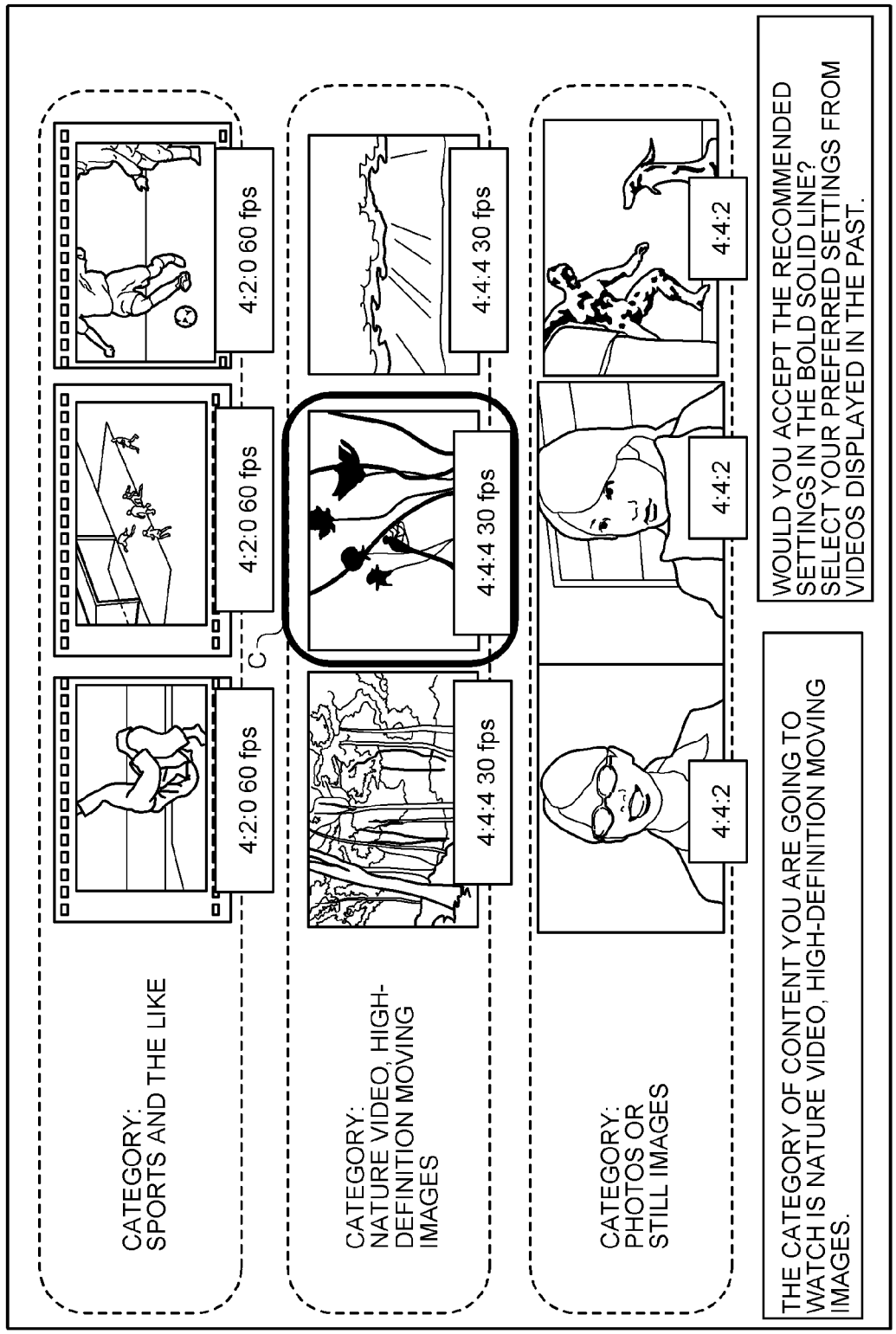
FIG. 7 is another exemplary diagram of the screen of the display in the embodiment.

Another example of the screen displayed on the display 11 of when the video receiver 10 selects one of video in which the color signal takes precedence over the frame rate and video in which the frame rate takes precedence over the color signal to be sent to the video receiver 10, will now be described. FIG. 7 is a second example of the screen displayed on the display 11 in the processing at S114 (FIG. 5) or the like. As illustrated in FIG. 7, in order to prompt a user to make selection in accordance with the user's selection histories, the display 11 may be configured so as to display a category of video involving active movements such as sports, a category of video involving few movements such as nature video in which the color signal can take precedence over the frame rate, and a category of photos or still images, together with the color signal (Y, Cr, Cb) and the frame rate that have been set in the past is displayed. The display 11 may also be configured so as to display an attribute of the contents the user is going to watch in accordance with the content information and to changeably display a recommended combination of the color signal and the frame rate by arranging a selection cursor C (with a bold solid line frame). The recommended combination of the color signal and the frame rate is determined in accordance with the user's selection histories or the content information.

FIG. 8 is a third example of the screen displayed on the display 11 in the processing at S114 (FIG. 5) or the like. The display 11 may be configured so as to display a screen that prompts a user to select which one of the color signal and the frame rate takes precedence over other one of the color signal and the frame rate, before switching the video currently being transmitted in which the color signal takes precedence over the frame rate to the video for which the frame rate might be preferred over the color signal for its transmission.

Each function of the first communication module 100 and the second communication module 200 may be provided in the form of either a computer program or the like, or hardware.

According to the embodiment described above, when video is sent from the video sender to the video receiver, the video receiver can make the setting on which one of the color signal and the frame rate takes precedence over other one of the color signal and the frame rate in video transmission.

In the embodiment described above, an example in which one of the color signal and the frame rate is preferred over other one of the color signal and the frame rate and in which the data corresponding to the one not preferred (the color signal (differential signal) or the frame rate) can be deleted has been explained. However, the embodiment is not limited to the example. Specifically, if an amount of data transmitted is contained within the limited bandwidth for transmission by the HDMI cable 30, a resolution, angle of view information, VIC information, color depth information, or color gamut can be changed, whereby the amount of data can be changed. Alternatively, if the amount of data transmitted is contained within the limited bandwidth for transmission by the HDMI cable 30, super-resolution can be performed in the sink device. In a series of descriptions above, an example of wired communication using the HDMI cable 30 (a cable for a display port may substitute) is used. However, the embodiment can be also applied to a wireless communication. In such a case, the HDMI cable 30 is not used and the first communication module 100 and the second communication module 200 respectively comprise a function for performing wireless communication.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video receiver comprising:
    a transmitter configured to transmit specific information to a video sender; and
    a first receiver configured to receive video data with 4:2:0 format transmitted in accordance with the specific information from the video sender via a digital interface comprising a first transmission channel, a second transmission channel and a third transmission channel, wherein
    the video data comprises four pieces of luminance information and two pieces of color information in four pixels, and
    the first receiver is configured to receive the color information of the video data with the 4:2:0 format only from the first transmission channel, to receive the luminance information of the video data with the 4:2:0 format only from the second and third transmission channels, and to receive two pieces of the luminance information and one piece of the color information at the same clock timing.

2. The video receiver of claim 1, wherein
    the digital interface is configured to comply with a predetermined standard, and
    a channel number of the third transmission channel is the next number of the channel number of the second transmission channel.

3. The video receiver of claim 2, wherein
    the color information comprises Cb component and Cr component;
    the luminance information comprises Y component;
    the digital interface is configured to comply with an HDMI standard,
    the first transmission channel is configured to be a channel 0 specified in the HDMI standard,
    the second transmission channel is configured to be a channel 1 specified in the HDMI standard,
    the third transmission channel is configured to be a channel 2 specified in the HDMI standard,
    the first receiver is configured to receive the Cb component and the Cr component of the video data with the 4:2:0 format via the first transmission channel of the digital interface, and
    the first receiver is configured to receive the Y component of the video data with the 4:2:0 format via the second and third transmission channels of the digital interface.

4. The video receiver of claim 3, wherein a frame rate of the video data is 60 fps, and a resolution of the video data is 3840×2160 pixels or 4096×2160 pixels.

5. The video receiver of claim 3, further comprising an input module configured to accept user operation, wherein
    the transmitter is configured to transmit the specific information in accordance with the user operation.

6. The video receiver of claim 5, further comprising
    a display; and
    an output module configured to output a graphical user interface (GUI) into the display, wherein
    the transmitter is configured to transmit the specific information in accordance with the user operation for the GUI.

7. The video receiver of claim 3, further comprising
    a display;
    a second receiver configured to receive video data which does not comply with the HDMI standard; and
    a selector configured to select one of the video data received in the second receiver and the video data received in the first receiver, wherein
    the display is configured to display the video data selected by the selector.

8. The video receiver of claim 7, wherein the second receiver is configured to be a tuner.

9. A video sender comprising:
    a receiver configured to receive specific information from an external apparatus; and
    a transmitter configured to transmit video data with 4:2:0 format to a video receiver via a digital interface comprising a first transmission channel, a second transmission channel and a third transmission channel, wherein
    the video data comprises four pieces of luminance information and two pieces of color information in four pixels, and
    upon receipt of the specific information, the transmitter is configured to assign two pieces of color information in the video data with 4:2:0 format only to the first transmission channel, to assign four pieces of luminance information in the video data with 4:2:0 format only to the second and third transmission channels, and to transmit two pieces of the luminance information and one pieces of the color information at the same clock timing.

10. The video sender of claim 9, wherein
    the digital interface is configured to comply with a predetermined standard, and a channel number of the third transmission channel is the next number of the channel number of the second transmission channel.

11. The video sender of claim 10, wherein the color information comprises Cb component and Cr component;

the luminance information comprises Y component;

the digital interface is configured to comply with an HDMI standard, the first transmission channel is configured to be a channel 0 specified in the HDMI standard, the second transmission channel is configured to be a channel 1 specified in the HDMI standard, the third transmission channel is configured to be a channel 2 specified in the HDMI standard, the transmitter is configured to transmit the Cb component and the Cr component of the video data with 4:2:0 format to the video receiver via the first transmission channel of the digital interface, and the transmitter is configured to transmit the Y component of the video data with 4:2:0 format to the video receiver via the second and third transmission channels of the digital interface.

12. The video sender of claim 10, wherein the transmitter is configured to transmit, when the received specific information, the video data of which a frame rate is 60 fps and a resolution is 3840×2160 pixels or 4096×2160 pixels.

* * * * *